July 3, 1962 E. V. GARNETT 3,042,422
DUAL FRONT WHEEL ASSEMBLY WITH AIR SUSPENSION MEANS
Filed Jan. 18, 1960 6 Sheets-Sheet 1

INVENTOR.
EDWARD V. GARNETT
BY
Horace B. Van Valkenburgh
ATTORNEY

July 3, 1962 — E. V. GARNETT — 3,042,422
DUAL FRONT WHEEL ASSEMBLY WITH AIR SUSPENSION MEANS
Filed Jan. 18, 1960 — 6 Sheets-Sheet 3

INVENTOR.
EDWARD V. GARNETT
BY Horace B. Van Valkenburgh
ATTORNEY

July 3, 1962  E. V. GARNETT  3,042,422
DUAL FRONT WHEEL ASSEMBLY WITH AIR SUSPENSION MEANS
Filed Jan. 18, 1960  6 Sheets-Sheet 4

INVENTOR.
EDWARD V. GARNETT
BY
Horace B. Van Valkenburgh
ATTORNEY

INVENTOR.
EDWARD V. GARNETT
BY
Horace B. Van Valkenburgh
ATTORNEY

July 3, 1962 E. V. GARNETT 3,042,422
DUAL FRONT WHEEL ASSEMBLY WITH AIR SUSPENSION MEANS
Filed Jan. 18, 1960 6 Sheets-Sheet 6

INVENTOR.
EDWARD V. GARNETT
BY
ATTORNEY

United States Patent Office 3,042,422
Patented July 3, 1962

3,042,422
DUAL FRONT WHEEL ASSEMBLY WITH AIR
SUSPENSION MEANS
Edward V. Garnett, 3963 Walnut St., Denver, Colo.
Filed Jan. 18, 1960, Ser. No. 3,115
13 Claims. (Cl. 280—96.2)

This invention relates to a dual front wheel assembly for vehicles, particularly trucks and the like and more particularly tractors for pulling trailers.

Trucks and tractor and trailer combinations, for economic competition, should be able to carry as great a pay load as possible. However, trucks and tractor and trailer combinations must meet, by law, two important requirements, namely, limitations on the height and the total length of a truck or tractor and trailer, and limitations on the load which may be supported at any one axle. Limitations on the total length of a tractor and trailer require that as much space as possible be cargo space, while load limitations on axles indicate that the front wheels of the tractor carry as great a load as possible. Thus, a conventional tractor for drawing a trailer, in which the engine is mounted forwardly of the cab, has disadvantages in that an undue amount of space longitudinally of the tractor is occupied by the engine and cab, while the front wheels, which must be turned for guiding purposes, do not carry as great a load as permissible. By mounting the cab directly over the front wheels and the engine also directly over the front wheels or under the frame additional space is made available for the load, i.e., an auxiliary load space may be provided on the tractor rearwardly of the cab, thus providing a greater load carrying capacity within the total maximum legal length, while the load on the front wheels can thus be increased.

Also, mounting the cab over the front wheels increases the visibility for the driver and thus provides greater highway safety.

Since a single front wheel at each side is normally unable to sustain as great a load as the trailer wheels or the rear tractor wheels, which are normally dual wheels or multiple dual wheels, the use of dual wheels as the front wheels not only enables the front wheels to carry an increased load, but also provides added safety against the dangers incident to front tire blowouts. However, the use of dual front wheels creates the problems of turning the dual front wheels and connecting the dual front wheels with the frame, as well as springing or suspending the frame from the front wheels, so that the driver is made as comfortable as possible and the load is protected from damage due to road shocks and jars. Thus, to mount dual front wheels on conventional spindles extending outwardly from the opposite ends of a front axle requires unduly large parts to sustain the overhanging load and also limits the lateral extent of the front axles, so that conventional springs will be too far inwardly. This produces a tendency toward side sway, which renders the vehicle more difficult to control and may actually create the danger of overturning on curves, as well as making the ride less comfortable for the driver. In addition, the space occupied by a conventional front axle and springs decreases the space available for the engine and cab, thus causing the engine to be mounted higher and the cab to be smaller and more cramped, to observe the height limitations when the engine is mounted over the front axle. Thus, it is desirable to be able to mount the engine at as low a position as practicable, to lower the center of gravity of the vehicle and also to provide as much room as possible for the cab. While a "pancake" type engine can be mounted under the frame, thus providing additional space for the cab at the front of a truck or tractor, the radiator and fan must still be mounted at the front, while other problems are not solved.

Among the objects of this invention are to provide a novel dual front wheel assembly; to provide such a dual front wheel assembly which enables a tractor to have additional pay load capacity; to provide a dual front wheel assembly which includes a front axle arrangement having a safe carrying capacity; to provide a dual front wheel assembly having maximum strength but light in weight; to provide a dual front wheel assembly which increases tire mileage; to provide a dual front wheel assembly in which the front wheels and tires are interchangeable with the rear wheels and tires; to provide a dual front wheel assembly which has a minimum of parts and thus is low in maintenance costs; to provide a dual front wheel assembly having a high degree of stability; to provide a dual front wheel assembly of symmetrical balanced design which tends to eliminate road shock between the assembly and the driver and load; to provide a dual front wheel assembly which permits independent rotation of all four wheels and thus allows the tires to roll on the ground individually for easy handling; to provide a dual front wheel assembly which tends to eliminate front end overloading; to provide a dual front wheel assembly, each of the four wheels of which may be provided with brakes for greater braking capacity, better cooling and less fading; to provide a dual front wheel assembly which has a novel spring arrangement; to provide a dual front wheel assembly having greater flotation on soft ground, minimizing the danger of losing control; to provide a dual front wheel assembly which permits the engine to be mounted at a lower position and provides sufficient space for a cab mounted above the engine; to provide a dual front wheel assembly which provides sufficient space for radiator and fan, as well as the cab, when the engine is mounted under the frame; to provide a dual front wheel assembly which tends to reduce side sway; and to provide such a dual front wheel assembly which may exist in more than one form; and to provide each such form which is simple in construction and effective in operation.

Additional objects and the novel features of this invention will become apparent from the description which follows, taken in conjunction with the accompanying drawings, in which:

FIG. 5 is a rear elevation of the upper portion of FIG. 3;

Figure 1:
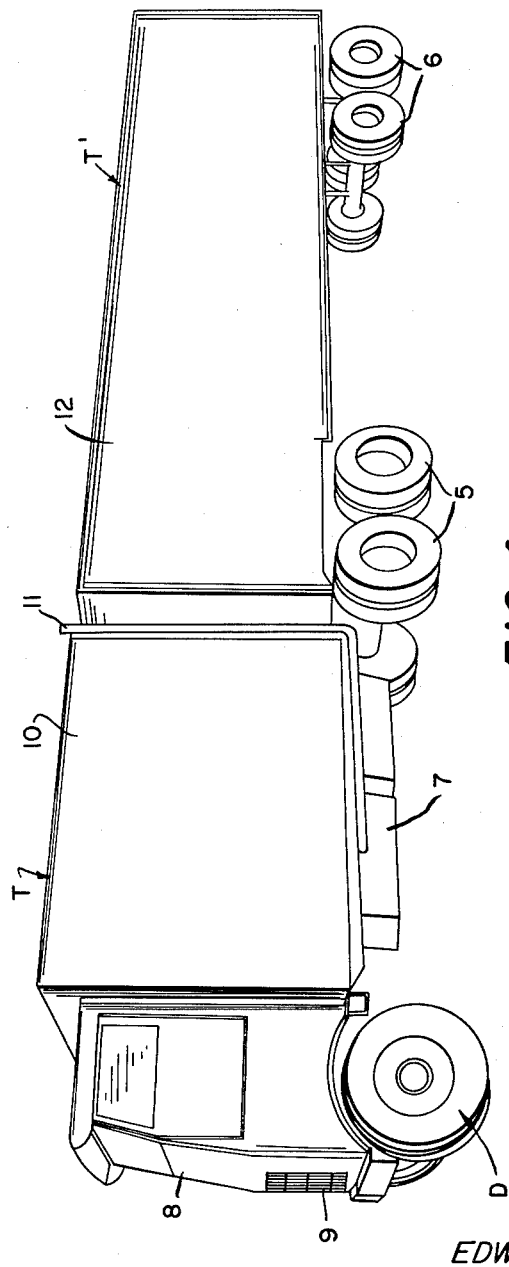
FIG. 1 is a perspective view of a tractor and trailer, utilizing the dual front wheel assembly of this invention.

The dual wheel front assembly of this invention may be utilized in a tractor T, as illustrated in FIG. 1, to which is connected a trailer T', the tractor T having conventional rear or drive wheels 5 and the trailer T' having conventional rear wheels 6, with the tractor and trailer connected in a conventional manner, as by a king pin, with a "pancake" type engine 7 mounted beneath the frame of the tractor. A cab 8, in the lower portion of which is a radiator 9 for the engine, extends below and also, at each side, over the pairs of wheels at each side of the dual front wheel assembly, thus providing sufficient space for the radiator and also adequate space for the driver in the cab. In this manner, it is possible to mount a cargo housing 10 on the tractor, directly behind cab 8, so that a large portion of the load carried therein will be supported by the front wheel assembly D. An exhaust pipe 11 conveniently extends from engine 7 alongside the frame of tractor T and then upwardly at the rear corner of tractor housing 10. The cargo carried in the tractor housing 10 is in addition to the cargo carried in a conventional trailer cargo housing 12, thereby increasing the load carrying capacity of the tractor and trailer, such as by as much as 50%, but without increasing the total length of the tractor and trailer beyond legal limits. As will be evident, due to the dual wheels on each side, the dual front wheel assembly D will readily support the cargo load in the tractor housing 10.

Figure 2:
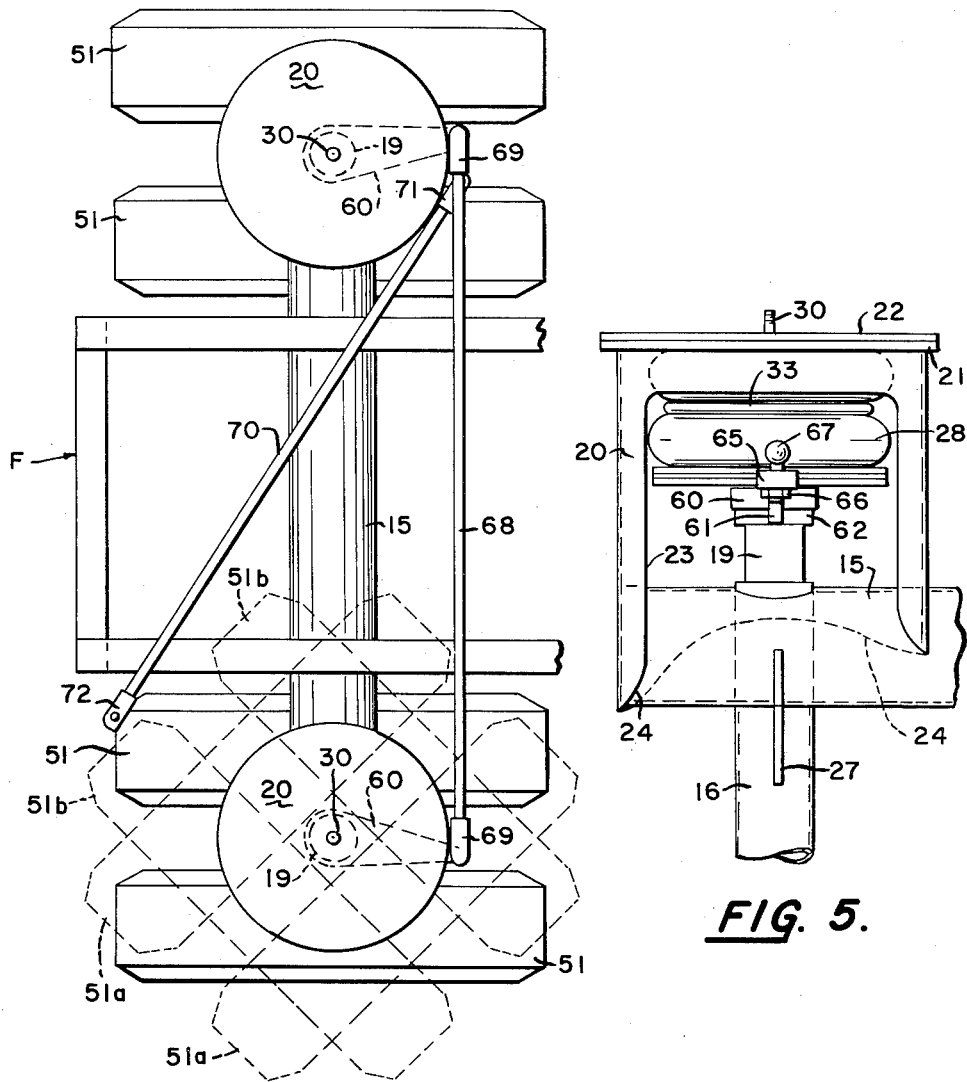
FIG. 2 is a top plan view, on an enlarged scale, of the dual front wheel assembly of the tractor of FIG. 1.
Figure 6:
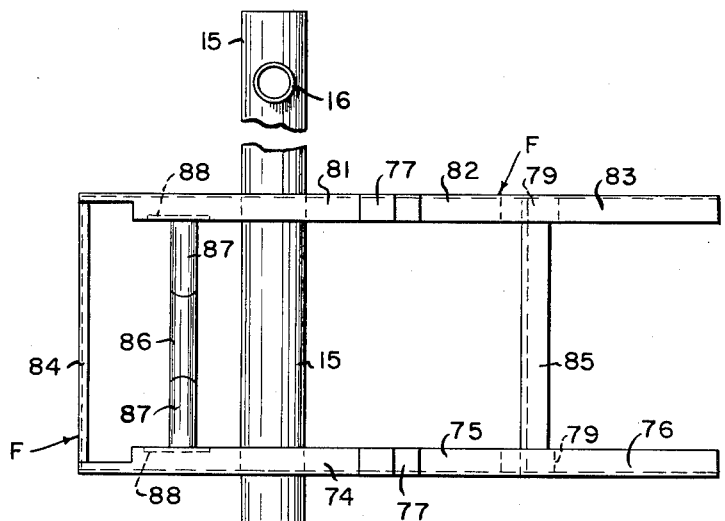
FIG. 6 is a top plan view of a special frame used in conjunction with the dual wheel assembly.

The dual front wheel assembly D includes a special frame F of FIGS. 2 and 6 the rear end of which forms the remainder of the frame of tractor T. As in FIGS. 2 and 6, the ends of a transverse beam 15, conventionally tubular, extend outwardly beyond the sides of the frame, while adjacent each end the beam 15 is provided with a vertical bore receiving a fixed vertical king pin sleeve 16 which, as in FIG. 4, terminates at the upper edge of the tubular beam 15, but extends downwardly below the beam for a substantial distance. The upper and lower ends of the king pin sleeve are each provided with a counterbore 17, in which is mounted a bushing 18 forming a bearing for a king pin 19. Bushings 18 may be made of any suitable material, such as nylon.

An air spring housing 20, having a generally circular cross section, is mounted on each end of beam 15, concentric with the corresponding sleeve 16, and is provided with a top flange 21 attached thereto, as by welding, and to which is attached a top plate 22, as by bolts. The rear side of each housing 20 is provided with a vertically extending cutout 23, as in FIG. 5, which permits movement of the steering linkage, which will be described later, while the lower edge 24 of each housing 20 may be curved, as in FIG. 3, to extend downwardly over the corresponding end of tubular beam 15, with the outer end of tubular beam 15 being curved to correspond to the inner surface of housing 20. The central portion of lower edge 24 of housing 20, on the inside, is generally semicircular, so that it fits over the upper half of tubular beam 15, while the lower edge 24, at the front and as indicated by dotted lines in FIG. 5, may be curved upwardly to facilitate attachment to the inside of housing 20, as by welding, of the front edge of a gusset plate 25, shown in dotted lines in FIG. 3. The rear edge of gusset plate 25 is conveniently welded to beam 15 and gusset plate 25 extends upwardly at a suitable angle, such as approximately 30° to the horizontal, while the front edge of gusset plate 25 is generally semi-elliptical in shape, so that it will conform to the inside of housing 20. To reinforce king pin sleeve 16, front and rear gussets 26 and 27, as in FIG. 3, may be welded to the front and rear of the king pin sleeve, respectively, while the upper portions of gussets 26 and 27 conform to the shape of tubular beam 15 and are welded thereto.

Figure 4:
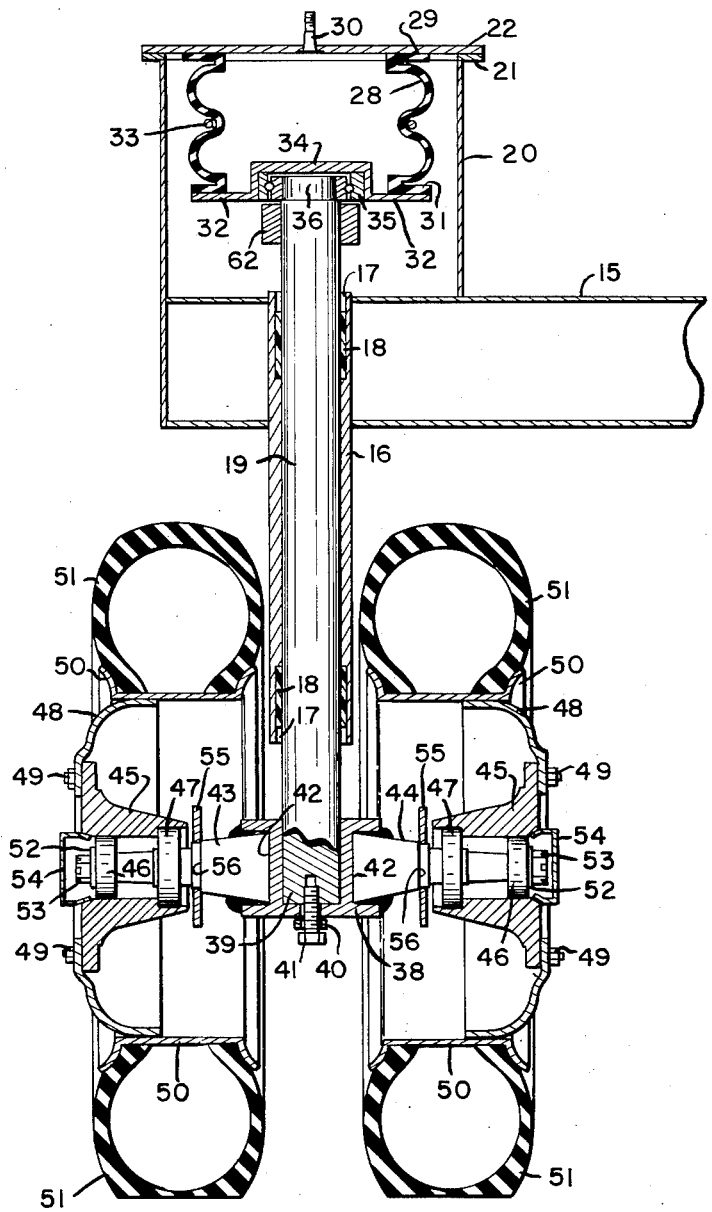
FIG. 4 is a vertical cross section, taken along line 4—4 of FIG. 3.

A tubular rubber air spring 28 having an upper flange 29 connected to the bottom of top plate 21, as by means of a suitable glue or adhesive, or by means of a clamping ring and bolts (not shown), may be inflated to a suitable pressure, such as 150 lbs., through a valved fitting 30 of FIG. 4. A lower flange 31 of the air spring 28 is similarly connected to an air spring mounting plate 32, while a reinforcing ring 33 is positioned intermediate the two flanges of the air spring, ring 33 having a diameter somewhat smaller than that of air spring 28, so that it causes the air spring to be pinched inwardly at the center, so that two generally arcuate wall sections of air spring 28 will be formed above and below ring 33 to resiliently accommodate road shocks and jars. Mounting plate 32 has a central, circular, upwardly extending well 34, receiving the outer race of a ball thrust bearing 35, the inner race of which is mounted on the reduced upper end 36 of king pin 19, to permit pivotal movement of king pin 19 relative to air spring 28.

An axle housing 38 is provided with a central well 39, receiving the lower end of king pin 19 and held in fixed relationship with respect to the king pin in any suitable manner, as by a key or by a class 7 press fit, and additionally by a clamping bar 40 provided with pins extending upwardly into king pin 19 and secured by a bolt 41. Axle housing 38 is also provided with oppositely disposed, lateral wells 42, in which stub axles 43 and 44 are respectively received and attached, as by welding. A conventional wheel, preferably identical to the wheels 5 and 6 of FIG. 1 for interchangeability, is mounted on each stub axle 43 and 44, such as comprising generally a hub 45 mounted for rotation upon the respective stub axle by bearings 46 and 47 and to which a wheel ring 48 is removably attached, as by bolts 49, the wheel ring 48 being provided with a flanged rim 50 for a tire 51. Each rim 50 may, in a manner conventional with truck wheels, be provided with an inner flange and an outer, flanged locking ring for the tire. Hub 45 is held on axle 43 or 44 in the usual manner, as by means of a retaining ring 52 held in place by a castle nut 53, through which a suitable cotter key (not shown) may be inserted, while the central opening in hub 42 may be closed by a hub cap 54.

As will be evident, each wheel is rotatable on stub axle 43 or 44 independently of the other wheel, although the wheels are turned simultaneously by king pin 19. If desired, one or both wheels at each side may be provided with a brake, conveniently operated by air pressure or vacuum in the same manner as the brakes of tractor T. Thus, a conventional brake drum may be mounted on hub 45 and the brake lining and actuating parts therefor mounted on a ring plate 55, in turn mounted on a shoulder 56 of stub axle 43 or 44, to a brake backing flange. An air or vacuum cylinder, for the brake or brakes, is conveniently mounted beneath housing 38, extending to each side into the space between the hub and the brake drum, while an air pressure or vacuum hose for the brake cylinder may conveniently extend downwardly alongside king pin sleeve 16 at the front or rear so as to be spaced from each tire and rim. Such a hose is conveniently connected into the brake system of the tractor.

Figure 3:
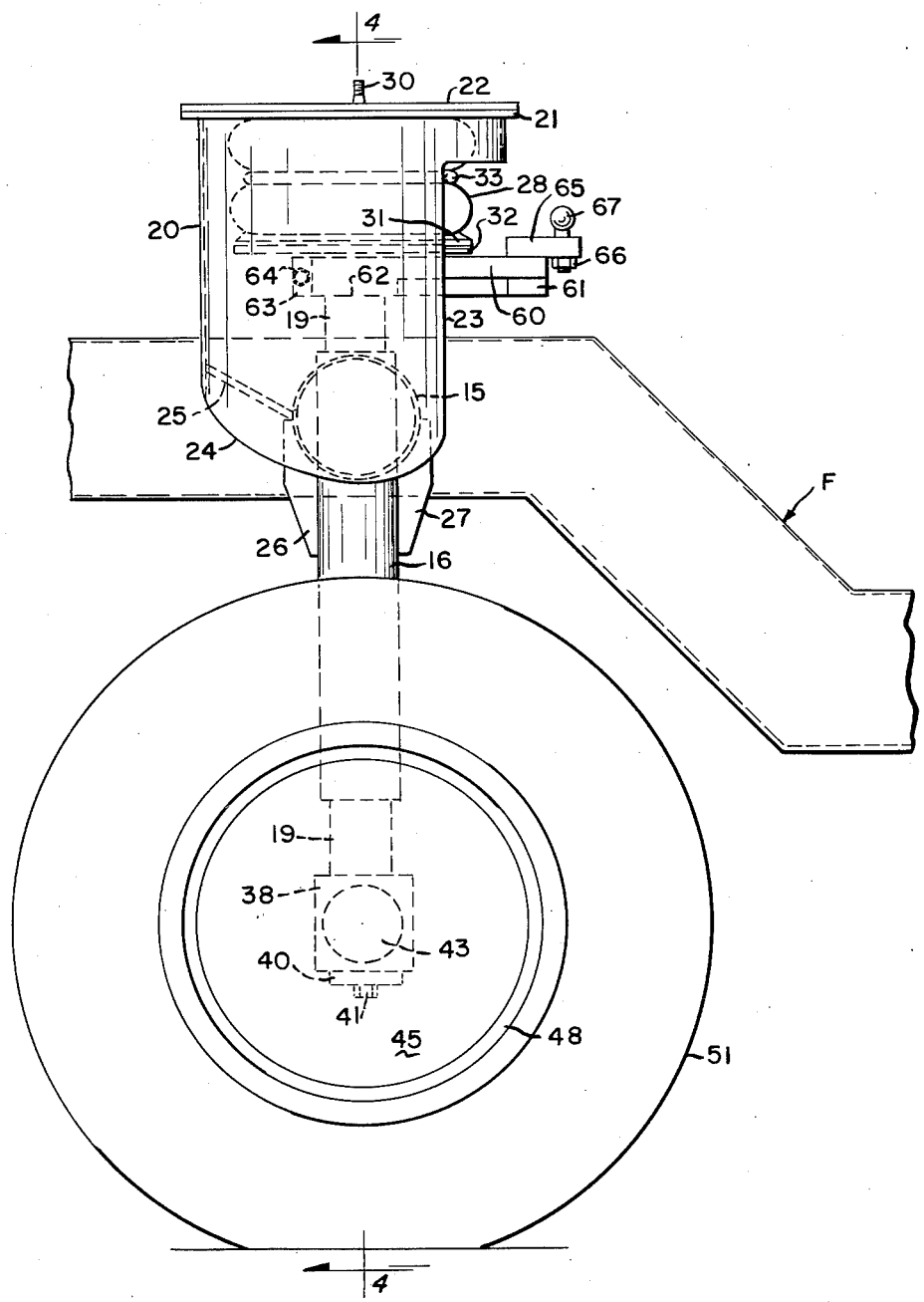
FIG. 3 is a side elevation of one side of the dual front wheel assembly.

A tie rod arm 60, as in FIG. 3, extends from the upper end of king pin 19, just below the rubber air spring 28 and through cutout 23 in air spring housing 20. Arm 60 is reinforced by a lower gusset 61 and the inner end of arm 60 is attached, as by welding, to a split ring 62 extending around the king pin with each end thereof having an outwardly extending flange 63, as also shown in FIG. 3, each flange 63 having a hole therein, for a bolt 64, by which the ring is tightened on the king pin to hold arm 60 in place. Opposite flanges 63, ring 62 is conveniently provided with a keyway and king pin 19 is provided with a corresponding keyway, for receiving a key which locks arm 60 to king pin 19, so that the king pin will be turned when arm 60 is moved. A mounting plate 65, for a tie rod bolt 66 having a ball 67 on its upper end, is attached, as by welding, to the outer end of arm 60. While only one side of the dual front wheel assembly has been described above, it will be understood that both sides of the dual front wheel assembly are identical but complementary so that they may be used on opposite sides of the vehicle.

As in FIG. 2, a tie rod 68 interconnects the tie rod arms 60 of each side of the dual front wheel assembly, each end of tie rod 68 having a socket 69 which receives a ball 67, of FIG. 3. Connected to one end of the tie rod 68 is a steering rod 70, having at one end a socket 71 connected to a ball head extending downwardly from tie rod 68 in a conventional manner and at its other end a ball head connection 72 for connection to the worm gear of the steering assembly in a conventional manner. As will be evident, other types of connections between tie rod 68 and arms 60, as well as between steering rod 70 and tie rod 68, may be used.

With the king pins 19 mounted in a substantially vertical position, as in FIG. 3, and the king pins spaced outwardly from the frame and the beam 15 above the wheels, a relatively sharp turning angle of the tractor or trailer is permitted, as seen by the dotted position of the wheels 51 in FIG. 2, wherein the wheels are turned to the left in positions 51a and to the right in positions 51b, because there are no axles or other supports to limit the total angle through which the wheels 51 may be turned.

Figure 7:
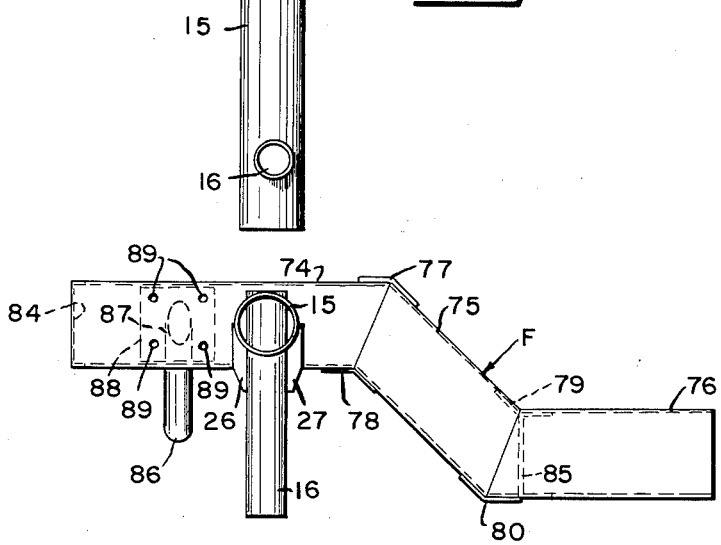
FIG. 7 is a side elevation of the frame of FIG. 6.

The construction of frame F may best be seen in FIGS. 6 and 7. The left side of the frame, as in FIG. 7, comprises an upper channel 74, a diagonal channel 75 and lower channel 76, the intersecting ends of which are cut diagonally, such as at approximately 60° to the horizontal, with channel 75 extending downwardly between channels 74 and 76 at an angle of about 45° and channel 76 extending rearwardly in a generally horizontal position, for attachment to the remainder of the tractor frame. The welded connection between the channels 74 and 75 may be reinforced by clips or angle plates 77 and 78, while the welded connection between channels 75 and 76 may be reinforced by clips or angle plates 79 and 80. Similarly, the opposite side of frame F comprises upper channel 81, diagonal channel 82 and lower channel 83, which are similar to channels 74, 75 and 76, respectively, and similarly attached together by welding and may be similarly reinforced by clips or angle plates. The sides of the frame formed by the above channels are maintained in proper spaced relation by a front bar 84, extending between the forward ends of channels 74 and 81, and a bar 85, extending between the forward ends of channels 76 and 83, bars 84 and 85 conveniently also being channels, as well as by the tubular beam 15, which extends through channels 74 and 81 and is conveniently welded thereto. As will be evident from FIG. 6, the king pin sleeves 16 are disposed at a considerable distance to each side, so that the tendency for side sway is minimized. A depending U-shaped cross bar having a dropped center 86 and ends 87 inclined upwardly therefrom, conveniently fabricated from tubular stock, extends between channels 74 and 81 intermediate the ends, but forwardly of beam 25. The ends 87 of the U-bar are attached to plates 88, which are welded to the inner edges of the respective channels 74 and 81 and which are provided with holes 89 for mounting an auxiliary drive, driven by the engine for the fan for radiator 9 of FIG. 1.

Figure 8:
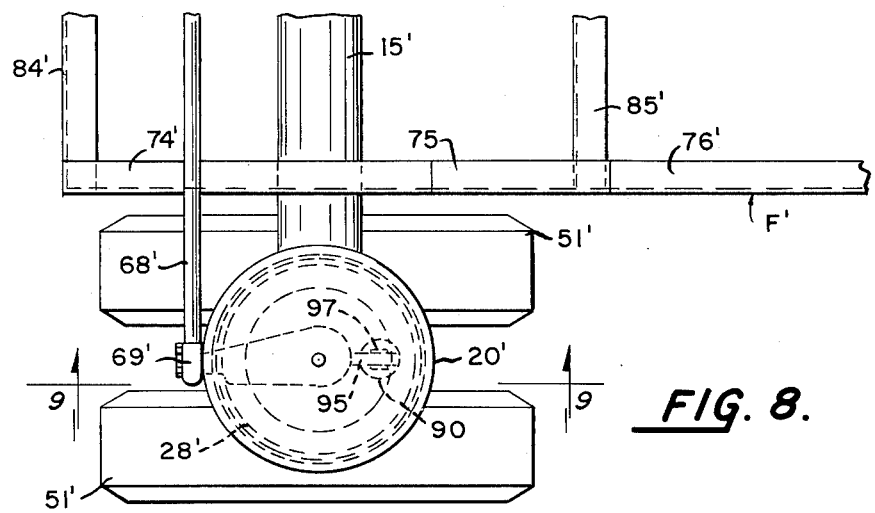
FIG. 8 is a partial top plan view, showing one side of an alternative form of a dual front wheel assembly constructed in accordance with this invention.
Figure 9:
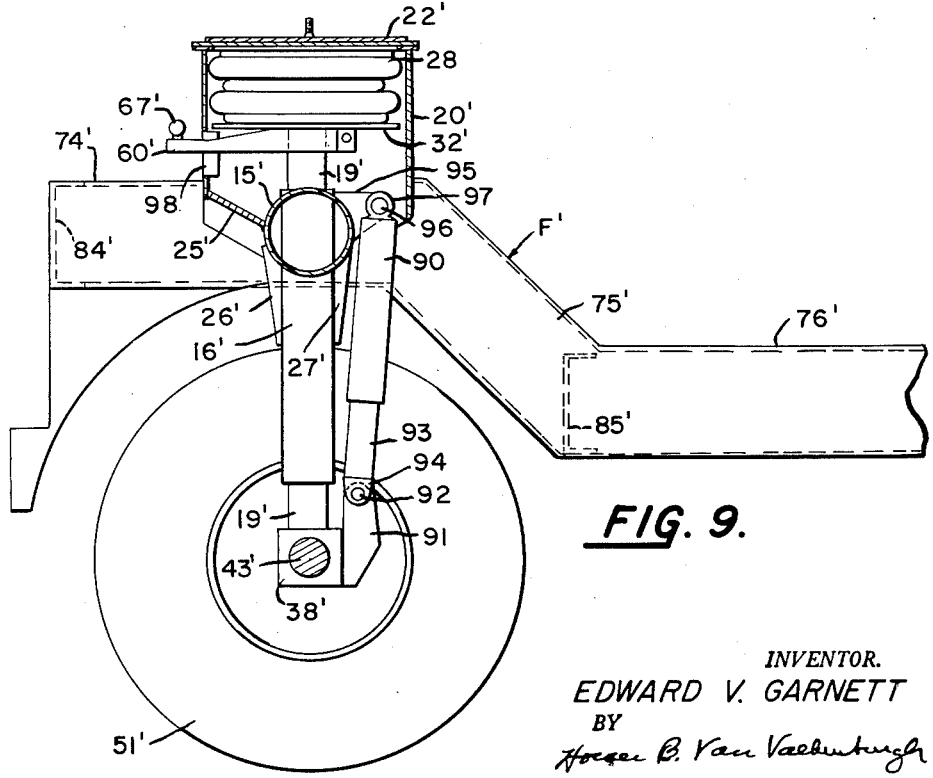
FIG. 9 is a vertical section taken along line 9—9 of FIG. 8.

In an alternative form of the invention, shown in FIGS. 8 and 9, hydraulic shock absorbers 90 are used with dual front wheel assembly, which includes a frame F' similar to frame F, thus including at one side an upper channel 74', a diagonal channel 75' and a rear horizontal channel 76' and corresponding channels on the opposite side, conveniently connected together in a manner similar to the corresponding parts of frame F and spaced apart by front bar 84' and cross bar 85'. Extending transversely of frame F' adjacent the forward end thereof, is a tubular beam 15', which extends through channel 74 and a corresponding channel on the opposite side of the frame, whose ends extend outwardly beyond the sides of the frame, while an air spring housing 20' is attached to beam 15' adjacent each end thereof above a king pin sleeve 16' which receives king pin 19'.

The top flange of a rubber air spring 28' is secured to the under side of a top plate 22' of housing 20', while the bottom flange is secured to mounting plate 32' supported upon king pin 19' by means of bearings in the same manner as shown in FIG. 4. King pin sleeve 16' is reinforced by front and rear gussets 26' and 27', while an axle housing 38' is attached to the lower end of king pin 19', as before, to receive stub axles 43 which in turn rotatably support wheels 51'. A lower flange 91, extending outwardly and upwardly from the rear of axle housing 39', is pivotally connected by a pin 92 with a rod 93 of shock absorber 90, rod 93 being provided with spaced ears 94 which extend downwardly on opposite sides of flange 91 for connection with pin 92. An upper flange 95 is welded to tubular beam 15' to extend rearwardly therefrom in vertical position, for pivotal connection of the upper end of shock absorber 90 by a pin 96, the upper end of shock absorber 90 being provided with spaced ears 97 which extend upwardly on opposite sides of flange 95 for connection to pin 96. As will be evident, the shock absorbers are interconnected between the wheel axles and the frame in such a manner as to stabilize the front wheel assembly. Space for the upper end of shock absorber 90 and its connection to beam 15' is provided within air spring housing 20', which is reinforced by a front gusset plate 25'. As in FIG. 9, link 60' is secured to king pin 19' to extend outwardly toward the front and is provided with a ball 67' to which a socket 69' of tie rod 68' may be attached, while air spring housing 20' is provided with a front cutout 98 through which link 60' extends and which accommodates movement of link 60'. The vertical arrangement of king pins 19' in this embodiment also permit a relatively sharp turning angle of wheels 51', since there are no axles or other supports to limit the turning angle.

From the foregoing, it will be evident that a dual front wheel assembly, constructed in accordance with this invention, fulfills to a marked degree the requirements and objects hereinbefore set forth. By using dual front wheels, it is possible to provide a cargo housing behind the cab of a tractor, in addition to the regular cargo housing of the trailer of a conventional tractor and trailer combination, thereby creating additional cargo capacity. By using dual front wheels, the safe carrying capacity of the front axle is increased, greater road contact is established, giving greater steering stability for the driver and increasing front end stability, and front end overloading may be eliminated. Due to the height of the cab seat, there is better driving vision, thus increasing safety, and there is greater safety against accidents due to front tire failure, as there will be no loss of control since the companion tire will carry the load in case of blowout of the other tire. Also, front tires and wheels may be used which are interchangeable with the rear tires and wheels.

The dual front wheel assembly of this invention is strong and, because of the small number of parts, maintenance costs are low. The symmetrical front end design and the air springs reduce the effect of road shocks on the steering assembly, giving an easy ride to reduce driver fatigue and cargo damage. Also, there is greater flotation on soft ground, minimizing danger of losing control. The position of the king pin at a considerable distance at each side reduces side sway, while the transverse beam which extends between the king pin sleeves permits the desired proportion of the weight of the tractor and its load to be readily transmitted through the frame to the king pins and the wheels. The use of a housing substantially enclosing the air spring and receiving the load from the air spring, which housing is attached to the transverse beam, permits the king pin to extend upwardly through the beam and transmit the load through the air spring, thus simplifying the construction. The cutout in the housing also permits a steering link to be connected to the king pin above the transverse beam, while a plate which is connected to the lower end of the air spring and also receives a bearing mounted on the upper end of the king pin, permits pivotal movement of the king pin and direct axial transmission of the weight to be supported through the air spring to the king pin, thus not only simplifying the construction but also providing better utilization of the air spring. The degree of pivotal movement of the king pin permits the front wheels to be turned through a relatively large angle, thus increasing maneuverability of the vehicle. The king pin sleeve may be relatively long, thus permitting the king pin to resist side thrust more readily. Each of the four wheels may readily be provided with brakes so that the increasing braking capacity produces better cooling and less fading. In many instances, a shock absorber, which is readily incorporated in the construction, will increase the effectiveness of the air spring.

Although the invention has been illustrated as applied to a tractor for a tractor and trailer combination, it will be understood that it may be utilized in trucks and other similar types of vehicles. Although a preferred embodiment and an alternative embodiment of this invention have been illustrated and described, it will be understood that other embodiments may exist and various changes and variations made, without departing from the spirit and scope of this invention.

What is claimed is:

1. A dual front wheel assembly for trucks and the like having a frame, comprising a beam extending transversely of said frame and attached thereto; a sleeve extending downwardly from said beam adjacent each end thereof; a king pin movable both pivotally and longitudinally in each said sleeve and extending both above and below said sleeve; a pair of wheels mounted for rotation on opposite sides of the lower end of each said king pin; a hollow air spring, formed of flexible material and adapted to be inflated with air, disposed above the upper end of each said king pin; thrust bearing means between the upper end of each said king pin and the lower end of the corresponding air spring; and means connecting the upper end of each said air spring with said beam.

2. A dual front wheel assembly for trucks and the like having a frame, comprising a beam extending transversely of said frame and attached thereto; a sleeve extending downwardly from said beam adjacent each end thereof; a king pin movable both pivotally and longitudinally in each said sleeve and extending both above and below said sleeve; a pair of wheels mounted for rotation on opposite sides of the lower end of each said king pin; resilient means disposed above the upper end of each said king pin; bearing means between the upper end of each said king pin and the lower end of the corresponding resilient means; means connecting the upper end of each said resilient means with said beam; and steering means connected to each said king pin between said sleeve and said bearing means.

3. In a dual front wheel assembly as set forth in claim 2, in which said steering means comprises a link attached to said king pin below said resilient means, said link being connectible to a tie rod.

4. In a dual front wheel assembly for trucks and the like, a frame; a pivotal king pin extending downwardly from said frame; a pair of wheels mounted for rotation on the lower end of said king pin; a hollow air spring formed of flexible material and adapted to be filled with air, said air spring having a lower end mounted on the upper end of said king pin; a housing substantially enclosing said air spring, said air spring being secured to said housing; means attaching said housing to said frame; bearing means mounted on the upper end of said king pin; and a mounting plate receiving said bearing and having an outwardly extending flange, said flange being connected to the lower end of said flexible air spring.

5. In a dual front wheel assembly, as set forth in claim 4, in which the ends of said air spring are provided with flanges extending outwardly therefrom, the flange at the lower end of said air spring being attached to said mounting plate flange and the flange at the upper end of said air spring being attached to the under side of the top of said housing.

6. In a dual front wheel assembly for a truck and the like having a frame, an axle housing; a pair of wheel axles extending outwardly from opposite sides of said axle housing; a king pin connected at its lower end to said axle housing and extending upwardly therefrom; guide means permitting pivotal and upward and downward movement of said king pin; a link attached to said king pin adjacent the upper end thereof, said link being adapted to be connected to a tie rod; bearing means mounted on the upper end of said king pin; a mounting plate having an upwardly extending well receiving said bearing means; a flexible tubular air spring filled with air and having the lower end thereof connected to said mounting plate; a housing generally enclosing said air spring and having a top plate, the upper end of said air spring being attached to the underside of said top plate of said housing; and means connecting said housing to said frame.

7. In a dual front wheel assembly as set forth in claim 6, wherein said guide means comprises a sleeve extending downwardly from said frame, said king pin extending through said sleeve and said sleeve having bearings therein engaging said king pin.

8. In a dual front wheel assembly as set forth in claim 7, in which said king pin is substantially vertical.

9. In a front wheel assembly for a truck and the like, a frame; a beam extending transversely of said frame, the ends of said beam extending outwardly beyond the sides of said frame, said beam having substantially vertical holes therethrough adjacent each end; a king pin extending through each said hole; bearing means for each said king pin; an air spring interconnected between the upper end of each said king pin and said beam; a separate link connected to each said king pin above said bearing means; and tie rod means interconnecting said links.

10. In a front wheel assembly for a truck and the like, as set forth in claim 9, including a sleeve for said king pin and having bearing means therein engaging said king pin.

11. A dual front wheel assembly for a truck and the like having a frame, comprising a tubular beam extending transversely of said frame, the ends of said tubular beam extending outwardly beyond the sides of said frame; a sleeve having a bearing at each end and secured to and extending through and downwardly from said tubular beam adjacent each end thereof; a king pin received in each said sleeve and extending above and below said sleeve; bearing means mounted on the upper end of each said king pin; a bearing plate engaging each bearing means for pivotal movement of the corresponding king pin; a flexible tubular air spring adapted to be filled with air having the lower end connected to each said bearing plate; a ring of smaller cross sectional size than said flexible tubular air spring engaging the center thereof; a housing generally enclosing said tubular air spring and having a closed top, the upper end of said air spring being attached to the under side of said housing top and the lower end of said housing being connected to said beam, whereby said frame is supported by said king pin through said flexible air spring; an axle housing secured to the lower end of said king pin; and axles extending from opposite sides of said axle housing for rotation of wheels thereon.

12. A dual front wheel assembly, as defined in claim 11, including a link attached to each king pin between said beam and said bearing means; and wherein said housing is provided with an aperture through which said link extends.

13. In a dual front wheel assembly for trucks and the like, a frame; a pivotal king pin extending downwardly from said frame; an air spring interconnecting said king pin and said frame so that the frame is supported by said king pin through said air spring; a sleeve mounted on said frame and extending downwardly therefrom, said king pin extending through said sleeve and said sleeve being provided adjacent each end thereof with a bearing engaging said king pin; and a shock absorber connected between the lower end of said king pin and said frame.

References Cited in the file of this patent

UNITED STATES PATENTS

| | | |
|---|---|---|
| 2,094,882 | Garnett et al. | Oct. 5, 1937 |
| 2,133,279 | Brown | Oct. 18, 1938 |
| 2,241,193 | Garnett et al. | May 6, 1941 |
| 2,304,291 | Wahlberg | Dec. 8, 1942 |
| 2,812,193 | Grace | Nov. 5, 1957 |
| 2,856,198 | Muller | Oct. 14, 1958 |

FOREIGN PATENTS

| | | |
|---|---|---|
| 764,321 | Germany | Aug. 16, 1954 |